United States Patent [19]

O'Connor

[11] Patent Number: 4,887,714

[45] Date of Patent: Dec. 19, 1989

[54] PRE-PACKAGED PRESSURE SENSITIVE TEAR TAPE

[75] Inventor: Lawrence J. O'Connor, Winnipeg, Canada

[73] Assignee: KT Technologies Inc., Bridgetown, Barbados

[21] Appl. No.: 141,957

[22] Filed: Jan. 11, 1988

[51] Int. Cl.4 .................................................. B65D 85/66
[52] U.S. Cl. ..................................................... 206/411
[58] Field of Search ................................... 206/411, 389

[56] References Cited

U.S. PATENT DOCUMENTS

| | | | |
|---|---|---|---|
| 2,307,406 | 1/1943 | Howard | 428/189 X |
| 2,395,668 | 2/1946 | Kellgren et al. | 428/40 |
| 2,532,011 | 11/1950 | Dahlquist et al. | 428/40 |
| 2,771,385 | 11/1956 | Humphner | 428/189 X |
| 3,509,991 | 5/1970 | Hurst | 206/411 |
| 3,770,542 | 11/1973 | Hall et al. | 206/411 |
| 3,810,813 | 5/1974 | Ellis | 428/189 X |
| 3,899,075 | 8/1975 | Hall et al. | 206/411 |
| 4,007,835 | 7/1977 | Klothe | 206/411 |
| 4,413,792 | 11/1983 | O'Connor | 242/67.1 R |
| 4,529,636 | 7/1985 | Olson | 428/189 X |
| 4,539,237 | 9/1985 | Clayton | 428/189 X |

Primary Examiner—Joseph Man-Fu Moy
Attorney, Agent, or Firm—Adrian D. Battison

[57] ABSTRACT

A narrow tape of polyester or other suitable plastic for use as a tear tape in the packaging industry slit from a wide web of the material, is coated wholly on one side and preferably at the edges with a suitable release material. Downstream of the slitting the tape is printed on the other side, then coated over the printing with a suitable pressure sensitive adhesive, said coating width being narrower than the width of the tape covering the printing and spaced from both side edges of the tape to avoid pick-off onto tape guide surfaces. The tape is then wound onto a core with both radial and axial traversing movements. The tape is then supplied to the packaging line preformed with adhesive to avoid on-line adhesive applications.

12 Claims, 4 Drawing Sheets

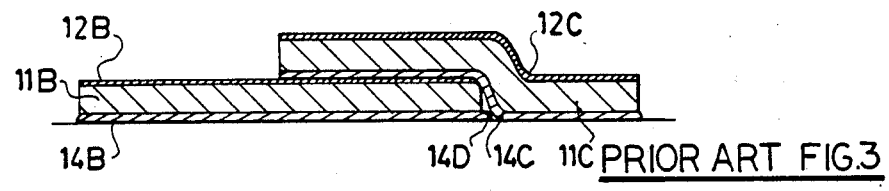
PRIOR ART FIG.3
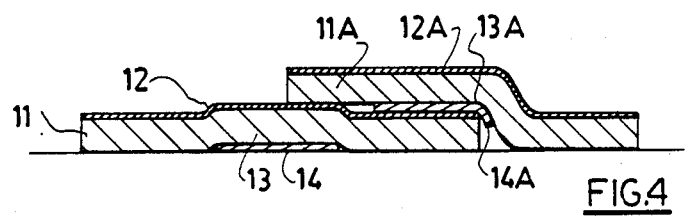
FIG.4
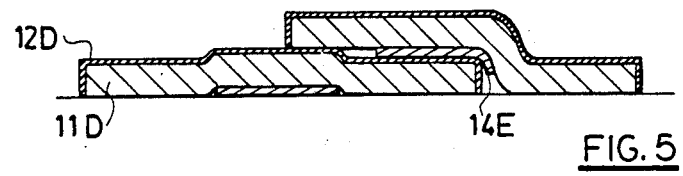
FIG.5
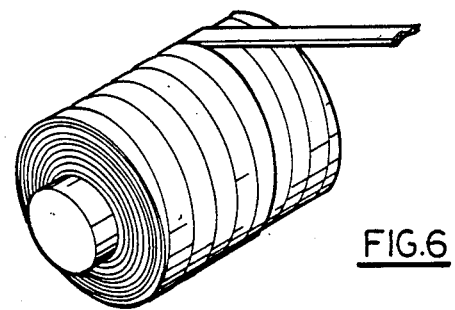
FIG.6

PRE-PACKAGED PRESSURE SENSITIVE TEAR TAPE

CROSS-REFERENCE TO RELATED APPLICATION

The present application is a continuation-in-part application of now abandoned U.S. application Ser. No. 003,805, filed Jan. 16, 1987 entitled PRESSURE SENSITIVE TAPE.

This invention relates to packaged pressure sensitive tear tapes and to a method for forming such tapes.

A tear tape is a narrow tape of a film material which is in use adhesively applied to an inner surface of a thermoplastic film overwrap during a packaging process so that the overwrap can be readily torn for unwrapping.

Such a tape to serve its purpose has to have the following properties:

(a) It has a width in the range 2 to 8 millimeters to provide merely sufficient width to act as a tear line propagating material;

(b) It has a breaking strength sufficient to avoid rupturing during the manual pulling of sufficient force to propagate the tear line;

(d) It is formed of a thin film material having a thickness in the range 6 to 125 microns which is not sufficient to interfere with the proper smooth outer form of the package overwrap.

In a first commonly used packaging technique, the adhesive used to attach the tear tape to the overwrap is applied on the packaging line in the form of a hot-melt adhesive. A hot-melt adhesive is one in which the adhesive is heated to reduce the viscosity to a level at which it can be applied to the tape, with the adhesive remaining in heated condition as the tape is moved into contact with the packaging material so that the heated adhesive material acts to bond the tape to the packaging material. This technique requires heated glue pots and heated shoes be added to the packaging line which require constant operator attention, and preclude the starting of the packaging line without the loss of a number of packages because of the necessity of stabilizing the heat input of the line and hence the temperature of the adhesive after startup.

The tear tape is supplied in a long length package which is manufactured in the conventional manufacturing technique from a wide web of a substrate material which has optional printing thereon and is forwarded on a slitting and winding machine to a slitting station where the web is slit into separate tapes of the order of two to four millimeters in width. The slit tape is then forwarded to a wind-up station where the tape is packaged into a cylindrical package of a long length of the tape.

The packaged tear-tape is then transferred to the packaging machine and set up so that it can unwind and supply the tear-tape to the packaging machine. On the packaging machine is provided an adhesive applicator which applies adhesive along the tear-tape prior to being bonded to the packaging film or overwrap. As a hot-melt adhesive is used, which is applied in hot form and as it cools bonds the tear tape to the overwrap, the adhesive applicators must therefore be positioned closely adjacent the packaging process and are considered to be a nuisance on the packaging line and require a high level of operator attention.

Attention therefore has been given to a second technique in which packaged tear tapes are supplied which have a pre-applied layer of a pressure sensitive adhesive thus avoiding the necessity for the adhesive applicators on the packaging line. Pressure sensitive tapes are well known and have been manufactured for a long period of time.

A pressure sensitive adhesive is one in which the adhesive effect is activated merely by the application of pressure between the tape carrying the adhesive and a surface and on to which it is to be adhered. The adhesive can be applied by solvent or other techniques in a thin film. Various different types of material suitable for this purpose are well known by those skilled in the art.

In manufacture such tapes are conventionally slit from a master roll that is completely coated on one side with the pressure sensitive adhesive and on the other side a release coat is usually applied.

Such tapes have overcome many of the problems associated with applying the adhesive on the packaging line, particularly the operator attention but have introduced a different problem. Particularly, "blocking" or adhering of the lower layer of adhesive to the outer edges of the succeeding or previous layers of tape in the tape package can occur. When the tape is unwound from the package, portions of adhesive from one layer are attached to and held by the adhesive at the edge of the tape of the next layer and are then carried by the edge and at the edge exposed to make contact with guide mechanisms used in the unwinding and tape guiding process. It will be appreciated that these exposed portions of adhesive can and will transfer to the tape guiding mechanisms of the machinery in what is known as "edge pick-off". Any adhesive on the machinery will quickly cause yet further adhesive to become attached to the machinery and to be built up at that point thus forcing the machinery to be shut down for cleaning. Cleaning requires a costly and time consuming shut down of high capital cost machinery.

Furthermore, after the tape is applied to the overwrap on the wrapped article, "edge bleedout" of the adhesive can occur beyond the edges of the tape. This can cause the tear tape to bond to the article and deface the article as it is being unwrapped.

It is one object of the invention therefore to provide a new construction of packaged pressure sensitive tear tape.

The invention therefore provides a package of tear tape comprising a tape in the form of an elongate, thin supporting substrate consisting of only one single layer of a film material having a strength, width and thickness adapted for use of the tape as a tear tape in propagating a tear line in a packaging material, and a layer of adhesive on one surface of the substrate, said tape being wound into a long length package which is circular cylindrical in shape having an axial length greater than the width of the tape with the tape traversing axially of the cylindrical package as it winds around the cylindrical package, characterized in that said layer of adhesive on said one surface of the substrate comprises a layer of a pressure sensitive adhesive which lies along the substrate longitudinally of the substrate in a width less than the width of the substrate at a position intermediate the width of the substrate with each side edge of the adhesive layer spaced from that one of the side edges of the substrate which lies adjacent to the side edge of the adhesive by a distance such that spreading movement of the adhesive layer under pressure in the wound package does not cause the adhesive to reach the edges of the substrate.

According to a second aspect of the invention there is provided a method of forming a tape comprising supplying an elongate web of a film material having a width a plurality of times greater than the width of the tape, forwarding the web in a longitudinal direction thereof, slitting the web into a plurality of separate tapes each having a strength, width and thickness adapted for use of the tape as a tear tape in propagating a tear line in packaging, and winding each of the tapes into a circular cylindrical package by rotating the package and relatively traversing the package and the tape in a direction axially of the package to form a package having a length greater than the width of the tape, characterized in the step of applying to each of the separate tapes subsequent to the slitting and prior to the winding thereof a layer of a pressure sensitive adhesive having a width less than the width of the tape and positioned intermediate the width of the tape with each side edge of the adhesive layer spaced from that one of the side edges of the tape which lies adjacent to the side edge of the adhesive by distance such that spreading movement of the adhesive layer under pressure in the wound package does not cause the adhesive to reach the edges of the tape.

The invention will be more apparent from the following description taken with the accompanying drawings in which:

FIG. 3, is a cross sectional view through a small portion of a package of tape of a prior art type.

FIG. 4 is a cross sectional view of the tape according to the invention applied to a core of a package.

FIG. 5 is a cross sectional view similar to FIG. 4 of a further embodiment of tape.

FIG. 6 is an isometric view of a package of the tape of FIGS. 1 and 4.

Figure 1:
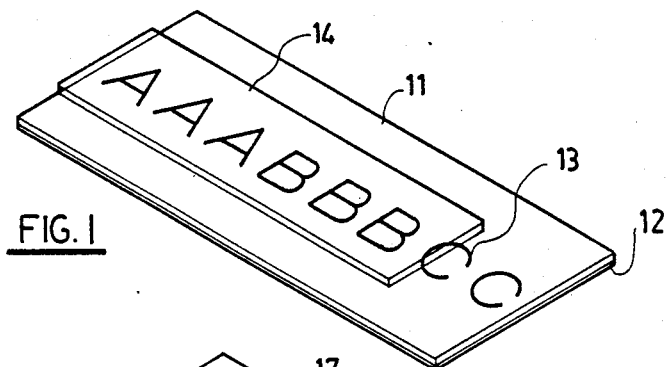
FIG. 1, is an isometric view of a short length of tape according to the invention.

FIG. 1 shows schematically a typical portion of the subject tear-tape, with dimensions therein exaggerated for purposes of clarity. The substrate of the tape is indicated at 11, which may be of any film material having the properties defined hereinbefore in the range of 2 to 8 millimeters in width and of a thickness in the range of 6 to 125 microns. The lower surface of substrate 11 is coated with any suitable release agent 12, and on the upper side optional printing 13 is produced with suitable inks by means of conventional processes.

Over the printed characters, but not extending to the edges of substrate 11, is placed a layer 14 of pressure sensitive adhesive whose width is less than the width of the substrate and with side edges both of which are spaced from a respective edge of the substrate. The tape is then wound into a package suitable for the end users' dispensing apparatus, and it will be noted that in this stage release agent 12 prevents any unwanted adhesion of the pressure sensitive adhesive with the layer or layers of tape immediately above or below. The adhesive layer is arranged to be narrower than the width of the substrate by an amount which effectively prevents "edge bleed".

It will be appreciated that in a package the pressure generated will always cause some movement of the adhesive but in the present invention this is prevented from reaching the edges of the tape.

In this regard attention is directed to U.S. Pat. No. 3,025,015 granted to Robert C. Mix, wherein an attempt is made to eliminate the problem of pressure sensitive adhesive making contact with the edges of preceding or succeeding layers.

While the above description outlines the preferred embodiment of the invention, it should be noted that printing, when used, may be placed on the lower side of the tape, and visible through it with the same inherent advantages of the invention.

Figure 2:
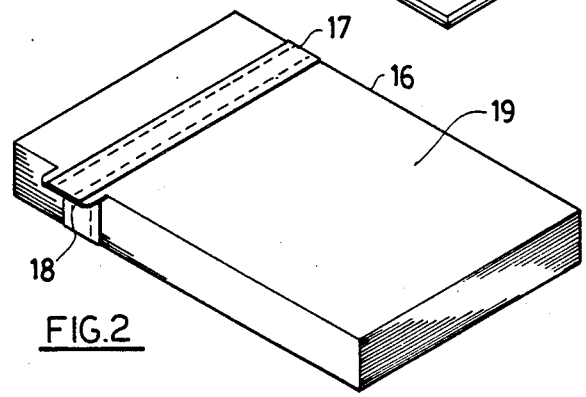
FIG. 2, is an isometric view of the tape of FIG. 1 applied to a packaged object.

In the usual process of final packaging the tape strip is pre-adhered to the packaging film or overwrap, which may be of polypropylene or other suitable thermoplastic material in the range of 12 to 50 microns in thickness, then incorporated into the final package 19 as depicted in FIG. 2, where 16 represents the plastic packaging film or overwrap, on the inner side of which is adhered tape 17, which normally extends all around the package body 19, and is generally provided with a tab 18 coextensive with the end of tape 17, providing a finger grip or "moon tab" with which the package may conveniently be opened.

While the above description is primarily directed to those packages in which the transparent overwrap is opened by the tear tape, similar tapes in the heavier gauges as noted above, may be placed around the inner perimeter of a package, with one end of the tape protruding through the package at a corner joint, such tape then serving to open the package by shearing the package material as the tape is pulled.

In FIG. 6 there is shown a cylindrical package formed by the method described hereinafter so that the tape traverses gradually along the length of the package as the package rotates, thus forming a cylindrical package of length greater than the tape width.

In FIG. 4 is shown a small cross section through a portion of the package of FIG. 6 in which one tape layer is shown with the next adjacent overlying tape layer also shown. For convenience of illustration other tape layers are omitted. Thus the first layer is shown incorporating the previous components described except the optional printing, that is the substrate 11, a release coating 12, and an adhesive layer 14. A second tape layer is applied in the winding process to the outer surface of the first tape layer with the components indicated at 11A, 12A and 14A respectively. It will be noted particularly that the adhesive layer is fully covered by the turned down side edges of the tape which are free from the adhesive layer. There is no possibility, therefore, of the adhesive layer 14A contacting the adhesive layer 14.

The contrasting situation is shown in FIG. 3 in relation to the prior art where the substrate is indicated at 11B, the adhesive layer at 14B and the release coating at 12B. A second layer is indicated at 11C, 12C, and 14C respectively. In this case it will be noted that, particularly under pressure, the adhesive layer 14B tends to slightly spread so that the adhesive layer 14C at the side edge indicated at 14D of the first layer can in some cases contact the adhesive layer 14B. Thus when unwinding takes place, the side edge 14D can pull off a portion of adhesive from the contacting underside of layer 14C. That portion will then be carried by that edge to contact machinery edge guides to cause what is known as "pick-off". It will be appreciated that the tape on the package is in the condition as shown substantially throughout its whole length so that points where adhesive transfer can occur are common.

In FIG. 5 is shown a further embodiment of the invention in which the release coating 12D is applied to the substrate 11d subsequent to slitting of the tape so that the release coating also is applied to the edges of the slit tape. This further reduces the possibility of the adhesive layer 14E contacting the edge of the tape layer 11D and becoming adhered thereto since the edge is provided with the release coating.

In the packaging of the tape according to the present invention therefore, the adhesive layer is fully protected by the edges which are free from adhesive and tend to fold down around the adhesive. This enables the tape with pressure sensitive adhesive to be used in a subsequent process without the previous disadvantages of edge pick-off. Such an arrangement is completely unique and moves against the conventional teaching in this field in which such pressure sensitive tapes have to date always been manufactured by slitting from a master web of the tape which is completely covered by an adhesive layer.

In some cases, certain materials used as the substrate may not need a specific release coating since the material itself has sufficient release properties.

Figure 7:
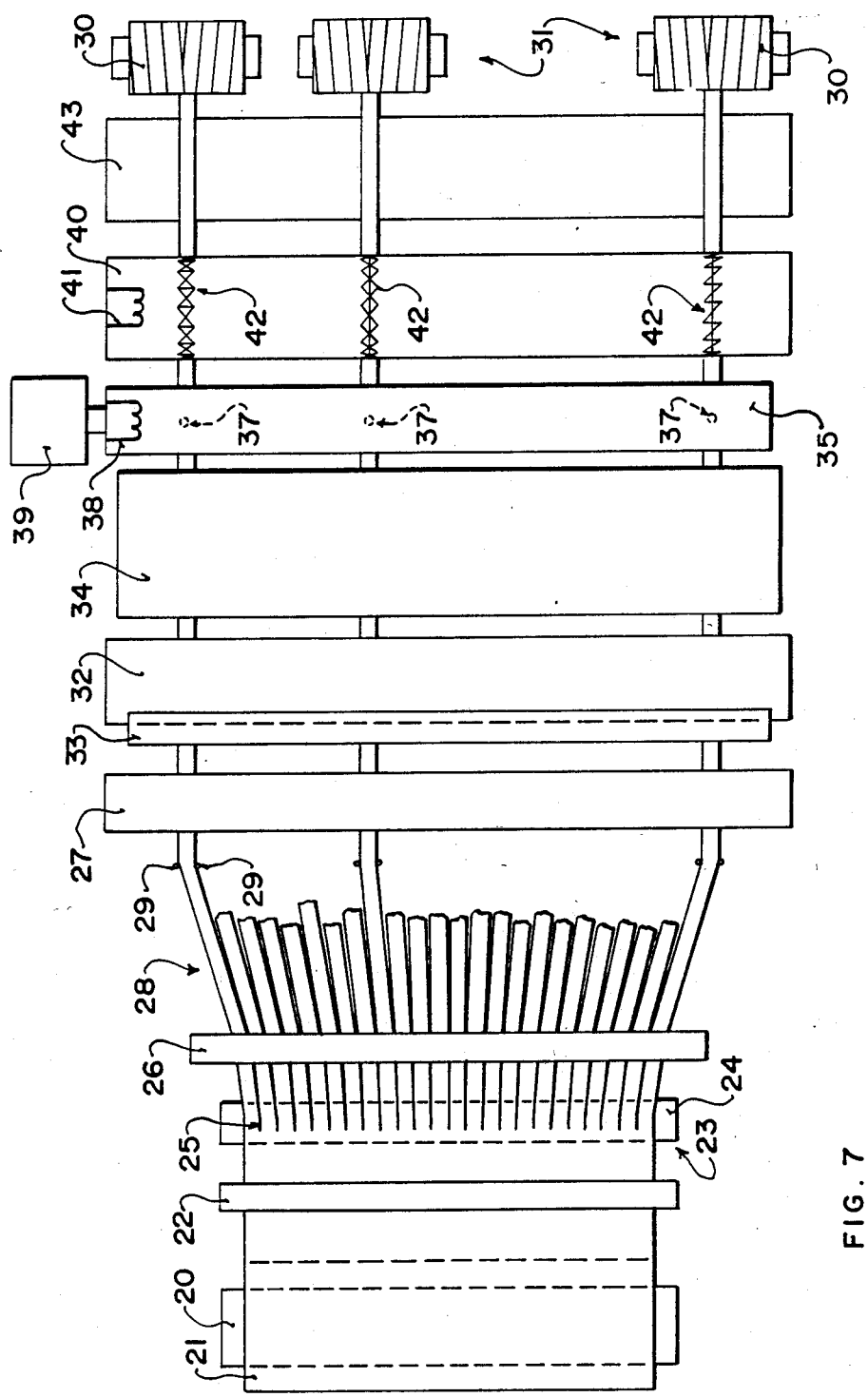
FIG. 7 is a schematic illustration in a plan view of an apparatus for forming the tape according to the invention.
Figure 8:
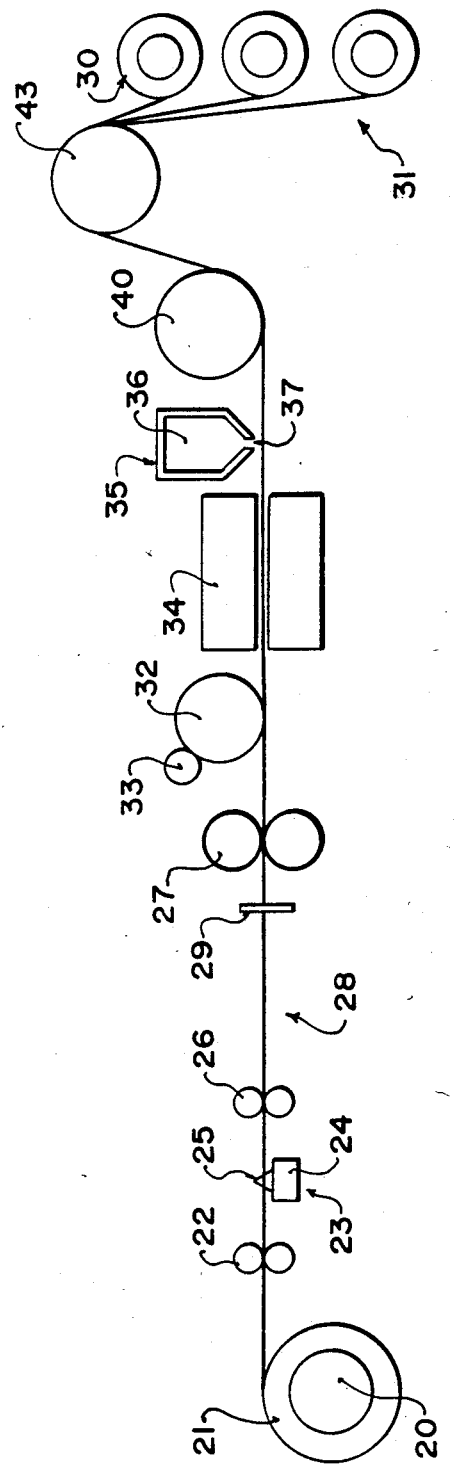
FIG. 8 is a schematic view of the apparatus of FIG. 7 in side elevation.

Turning now to FIGS. 7 and 8, an apparatus for manufacturing the above described tape is shown schematically. The apparatus comprises a support 20 for a web 21 which is of sufficient width to form a plurality of the tapes as previously described. The web 21 is fed through a pair of nip rollers 22 forwardly past a slitter 23 in the form of a bar 24 carrying a plurality of knives 25 to a further pair of nip rollers 26 which control the tension in the web and the positioning of the web relative to the slitters 25.

The web 21 is dimensionally of poor stability so that its width can vary widely depending upon temperature and other conditions. The slitting is arranged to take place at a position across the width of the web which leaves waste material on either side of the web. In this way the slit width of the tapes is maintained relatively accurate while the waste material at either side of the web can vary depending upon any stretch or contraction occurring in the web due to temperature changes. Subsequent to slitting into the separate tapes, of course the dimensional stability of the tape is very much increased in view of its very narrow width so that while the web itself as a whole may change in width by significant amount relative to the width of a tape, each individual tape varies only over a small amount relative to its own width.

Downstream of the nip rollers 26 is provided a further pair of nip rollers 27 which again control the tension in the tape across a spreading zone indicated at 28 in which the tapes are increased in their spacing so that subsequent processing of the tapes takes place with the tapes separated each from the next. The spreading is controlled by a plurality of spreader guides 29 which are positioned with each pair of guides cooperating with the respective one of the tapes so as to guide the tape therebetween to a required spaced position along the length of the nip rollers 27.

Downstream of the nip rollers 27 each tape is separately processed and finally wound into a package 30 of the type previously described at a winding station schematically indicated at 31.

Between the nip rollers 27 and the winding station 31, each tape passes firstly against a printer roller 32 which is suitably engraved with a wording or other characters to be applied to the tape. The printer roller carries printing ink from applicator roll 33 onto an upper surface of the tape. From the printer roller, the tape passes through a drying tunnel 34 which is sufficient in length and temperature to drive off the solvents from the printing ink to ensure that it is fully dry before encountering an adhesive applicator indicated at 35.

The adhesive applicator comprises a manifold 36 which has a plurality of small openings 37 in an under surface thereof each cooperating with a respective one of the tapes. The applicator is heated by a heater schematically indicated at 38 so that an adhesive material in the manifold 36 is maintained at an elevated temperature to reduce its viscosity and allow it to flow through the openings 37. A pump is indicated at 39 and controls the feed of the material into the manifold 36 and thus the flow rate through the openings 37. The openings 37 are arranged to be very small relative to the width of the tape for example of the order of 0.5 millimeters so that a bead of adhesive is applied to the upper surface of the tape on top of the printed ink layer previously applied.

Downstream of the extruder 35 is positioned a hot gravure roller 40 maintained at an elevated temperature by a heater schematically indicated at 41. The heated roller 40 is positioned relative to the extruder 35 so that the pressure sensitive adhesive extruded onto the tape remains in a heated condition as it engages the roller 40. The roller is arranged relative to the tape so that it engages the tape on the same side as the adhesive so the adhesive is compressed and spread by its contact with the roller 40 to take up the width and position of the adhesive described in relation to the tapes hereinbefore. The roller 40 is engraved as indicated at 42 with a suitable pattern so the adhesive when spread by the roller takes up the imprint of the pattern 42 to provide a pleasing appearance when viewed through the transparent packaging in the finished package product.

Downstream of the heated roller 40 is provided a chill roller 43 which causes the thin layer of adhesive applied to and lying upon the tape to be chilled to complete the bond to the tape. The adhesive is as previously described of a pressure sensitive nature.

The processing of the tape after its slitting by the application thereto of the printing and the adhesive ensures that as far as possible the printing and the adhesive are applied centrally of the tape. It will be appreciated that the position of the tape after spreading at the roller 27 can be controlled relatively accurately. It is not in any way dependent upon the transverse dimensional stability of the web or the specific positioning of the slitters relative to the edges of the web.

In an alternative arrangement (not shown) the adhesive layer is applied intermittently as opposed to a continuous band of the adhesive, the spaces between the intermittent portion of course being sufficiently short to ensure that the tape remains at its required location on the overwrap material.

In a yet further alternative, the adhesive can be coloured and can act as the printing layer so that the adhesive itself serves both the purpose of attaching the tape to the overwrap and providing the conventional wording or other marking which shows the presence of the tear tape on the package.

I claim:

1. A package of tear tape comprising a tape in the form of a elongate thin supporting substrate consisting of only one single layer of a film material having a strength, width and thickness adapted for use of the tape as a tear tape in propagating a tear line in a packaging material, and a layer of adhesive on one surface of the substrate, said tape being wound into a long length package which is circular cylindrical in shape having an axial length greater than the width of the tape with the tape traversing axially of the cylindrical package as it winds around the cylindrical package, wherein said layer of adhesive on said one surface of the substrate comprises a layer of a pressure sensitive adhesive which lies along the substrate longitudinally of the substrate in a width less than the width of the substrate at a position intermediate the width of the substrate with each side edge of the adhesive layer spaced from that one of the side edges of the substrate which lies adjacent to the side edge of the adhesive by a distance such that spreading movement of the adhesive layer under pressure in the wound package does not cause the adhesive to reach the edges of the substrate.

2. The invention according to claim 1 wherein the substrate has a width lying in the range 2 to 8 millimeters and a thickness lying in the range 6 to 125 microns.

3. The invention according to claim 1 including a layer of printing ink on the substrate defining visible characters.

4. The invention according to claim 3 wherein the layer of printing ink is positioned between the adhesive layer and the substrate and wherein the adhesive layer is substantially transparent to allow viewing of the printed characters through the adhesive layer.

5. The invention according to claim 1 wherein on an opposed surface of the substrate is a layer of a release agent and wherein the layer of release agent extends also over the edges of the substrate.

6. A package of pressure sensitive tear tape comprising;
(a) a continuous film material having a first surface and a second surface and a strength and thickness sufficient for use as a tear tape;
(b) A continuous pressure sensitive adhesive means disposed substantially at the center of said second surface in a width less than the width of said second surface and spaced from the side edges of said film;
(c) a core having said film wound axially and radially thereon in an overlapping and offset manner.

7. The invention according to claim 6 wherein the substrate has a width lying in the range 2 to 8 millimeters and a thickness lying in the range 6 to 125 microns.

8. The invention according to claim 6 including a layer of printing ink on the substrate defining visible characters.

9. The invention according to claim 8 wherein the layer of printing ink is positioned between the adhesive layer and the substrate and wherein the adhesive layer is substantially transparent to allow viewing of the printed characters through the adhesive layer.

10. The invention according to claim 6 wherein on an opposed surface of the substrate is a layer of a release agent and wherein the layer of release agent extends also over the edges of the substrate.

11. A package of tear tape comprising;
(a) a substantially flat continuous film having a first surface and a second surface and side edges;
(b) an adhesive disposed on said second surface in a width less than the width of said second surface;
(c) a core having said substantially flat continuous film wrapped in a substantially uniform axial and radial manner in which the axial movement of said substantially flat continuous film is less than an amount of travel that would result in the contact of said adhesive on said second surface with said adhesive on the second surface of a preceding layer of said substantially flat continuous film.

12. A package of tape comprising a substantially flat continuous film having a first surface and a second surface and side edges with an adhesive disposed on said second surface in a width less than the width of said second surface and a core having said substantially flat continuous film wrapped in a substantially uniform axial and radial manner in which the axial movement of said substantially flat continuous film is less than an amount of travel that would result in the contact of said adhesive on said second surface with said adhesive on the second surface of a preceding layer of said substantially flat continuous film.

* * * * *